United States Patent [19]
Fukuwaka et al.

[11] Patent Number: 5,553,949
[45] Date of Patent: Sep. 10, 1996

[54] ROLLING CONTACT BEARING

[75] Inventors: Masao Fukuwaka; Tadaaki Maeda; Takahiro Koremoto, all of Iwata, Japan

[73] Assignee: NTN Corporation, Osaka, Japan

[21] Appl. No.: 438,336

[22] Filed: May 10, 1995

[30] Foreign Application Priority Data

May 11, 1994 [JP] Japan .................................. 6-097076

[51] Int. Cl.$^6$ .............................. F16C 33/38; F16C 33/66
[52] U.S. Cl. ................................................ 384/523; 384/470
[58] Field of Search ........................... 384/523, 470, 384/547, 546

[56] References Cited

U.S. PATENT DOCUMENTS

| | | | |
|---|---|---|---|
| 3,096,129 | 7/1963 | Hay | 384/470 |
| 3,647,269 | 3/1972 | McKee | 384/470 |
| 5,026,179 | 6/1991 | Ito | 384/523 |
| 5,165,804 | 11/1992 | Fisher | 384/523 X |

FOREIGN PATENT DOCUMENTS

| | | | |
|---|---|---|---|
| 1198273 | 12/1985 | U.S.S.R. | 384/470 |
| 719829 | 12/1954 | United Kingdom | 384/470 |

*Primary Examiner*—Thomas R. Hannon
*Attorney, Agent, or Firm*—Nikaido Marmelstein Murray & Oram LLP

[57] ABSTRACT

A slight clearance S1 is formed between the inner surface of the outer ring 2b and the outer surface of the cage 2d. The size of this slight clearance S1 is such that it causes concomitant rotation of the cage 2d associated with the rotation of the outer ring 2b.

9 Claims, 4 Drawing Sheets

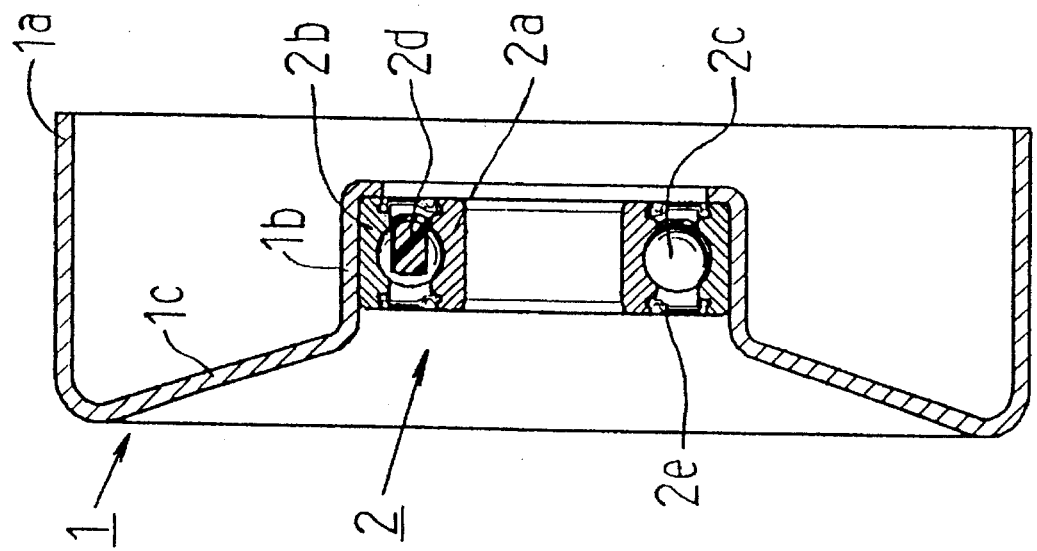
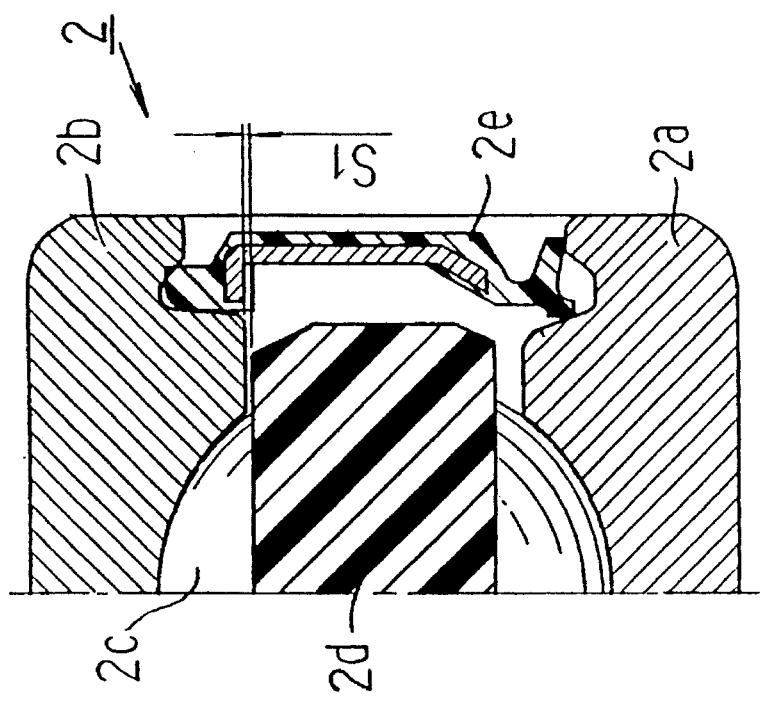

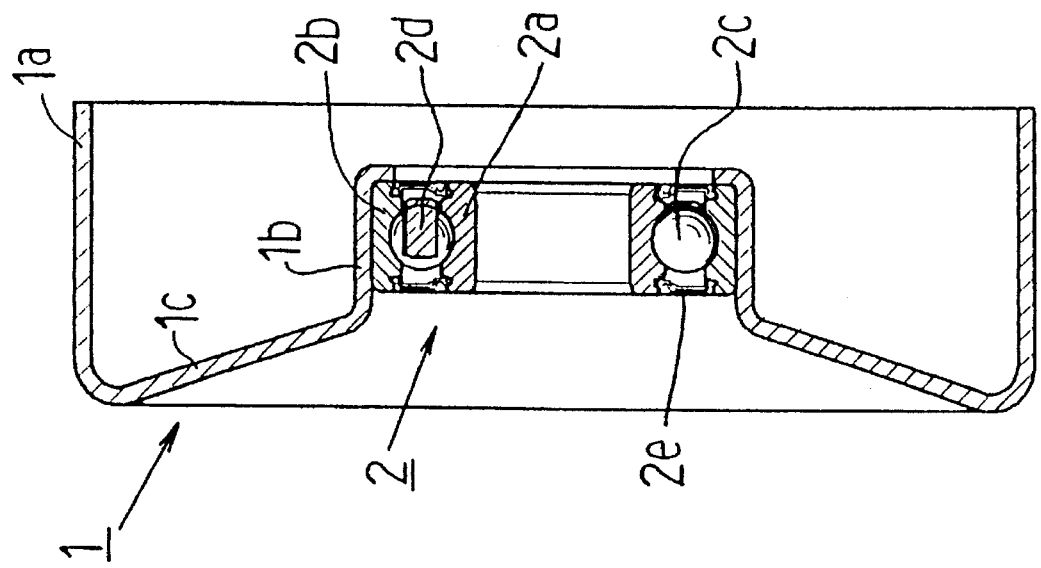
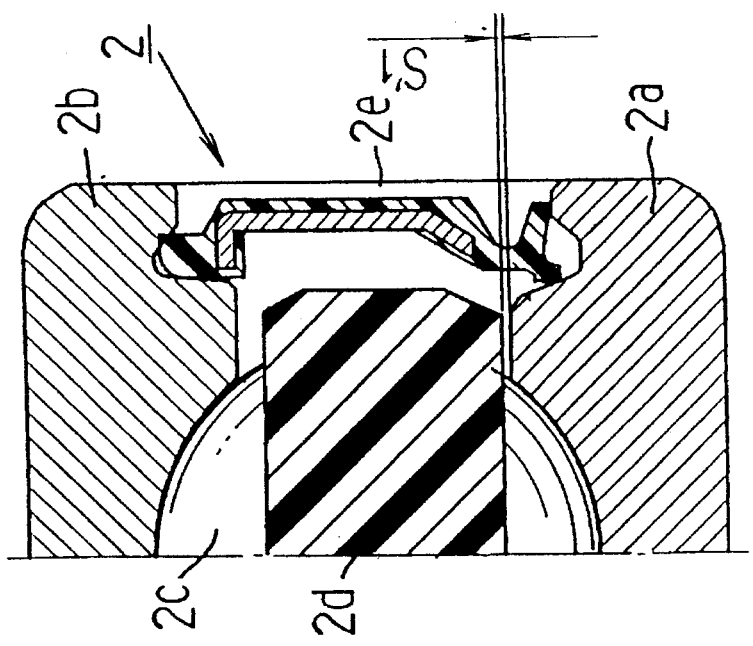

ROLLING CONTACT BEARING

BACKGROUND OF THE INVENTION

The present invention relates to a countermeasure against cold-time sounds in a rolling contact bearing or a pulley having a rolling contact bearing built therein.

For example, a tension pulley frequently used in a belt transmission for automobiles is of the type in which, as shown in FIG. 4, a pulley body 11 and a ball bearing 12 are integrated together for weight reduction. The pulley body 11 is a press-molded steel plate part, comprising an outer cylindrical portion 11a adapted to have a belt (not shown) entrained thereabout, and an inner cylindrical portion 11b in which the outer ring 12b of the ball bearing 12 is fitted. The ball bearing 12 is of the deep groove type, comprising an inner ring 12a to be fitted on a shaft (not shown), the outer ring 12b fitted in the inner cylindrical portion 11b of the pulley body 11, a plurality of balls 12c interposed between the raceway tracks of the inner ring 12a and the outer rings 12b, a cage 12d of synthetic resin for holding the balls 12c at circumferentially equispaced intervals, and seals 12e for sealing grease. When this tension pulley is rotated with the pulley body receiving a rotative power from the belt, the outer ring 12b of the ball bearing 12 fitted therein is rotated in a unit with the pulley body 11.

In this connection, when such tension pulley is operated at a cold time, it sometimes produces abnormal sounds. The cause of such abnormal sounds at a cold time or the so-called cold-time sounds still remains to be proved precisely. Furthermore, since tension pulleys used in automobiles and the like are operated under high temperature, high speed and high load conditions so that its durability is also an important characteristic, countermeasures which lead to a decrease in durability cannot be taken. For such reason, at present no decisive countermeasure has been developed against cold-time sounds occurring in tension pulleys.

It has heretofore been studied to use a grease which is superior in low temperature properties (such a grease as will uniformly form oil films in the areas of contact between the rolling elements and the raceway surfaces of the inner and outer rings). This countermeasure, which is intended to suppress the occurrence of cold-time sounds, can be expected to provide substantial effects. However, since the viscosity of the grease is lowered, there is a fear that the lubricating performance at high temperatures is degraded, leading to a decrease in durability.

Further, there are reports saying that occurrence of cold-time sounds has been suppressed by increasing the radius of curvature of the raceway surfaces of the inner and outer rings or by increasing the bearing clearances; however, such increase in the radius of curvature of the raceway surface or in bearing clearances results in angular swaying of the pulley body, tending to spoil the function of the tension pulley.

Further, there is a design in which in order to suppress the vibration sound (cage sound) due to a play in the cage, the cage is contacted with the outer or inner ring with a negative clearance defined therebetween. With this arrangement, however, the wear in the areas of contact between the cage and the inner and outer rings is liable to decrease the durability. Furthermore, the cage is always rotated at a speed greater than the speed of planetary rotation of the balls (because the cage is rotated as it is restrained by the inner or outer ring), resulting in pushing the balls hard at all times in the direction of planetary rotation of the bails; thus, the normal rotation of the balls is impeded, so that on the contrary, cold-time sounds are increased or even if they are not increased, the effect of suppressing them cannot be expected.

SUMMARY OF THE INVENTION

The present invention, proposed with the above in mind, is intended to provide a rolling contact bearing and a pulley which are designed to effectively suppress cold-time sounds while securing durability and which, therefore, are superior in durability and acoustic properties.

In the present invention, a slight clearance is formed between the inner surface of the outer ring of a rolling contact bearing and the outer surface of the cage thereof or between the outer surface of the inner ring and inner surface of the cage.

The outer ring of the rolling contact bearing is fitted, e.g., in a pulley. Further, it is recommendable to use a ball bearing as the rolling contact bearing.

Generally, it is known that sounds from a rolling contact bearing are produced owing to the vibration of the bearing. And these sounds are classified into two types, (1) a sound produced by the bearing itself and (2) a sound produced by a combination of the bearing and other machine parts.

The type of sound (1) is considered to be produced depending on (a) the elastic property and lubrication of the bearing, (b) the structure and shape of the bearing, and (c) awkward handling of the bearing. The sound in (1)–(a) is found when the presence of irregular circumferential roughness, surge, unevenness in oil film, and the like on the raceway surfaces of the inner and outer rings or the surfaces of the rolling elements causes microscopic periodic changes in the elasticity and friction coefficient in the areas of contact between the rolling elements and the raceway surfaces when the rolling elements are rotating on the raceway surfaces, said changes producing self-excited vibration of the rolling elements, thereby forcing the inner and outer rings to vibrate, the natural vibration thereof causing said sound. Included in this sound is the essential sound of the bearing, called the race sound. Further, the sound in (1)–(b) is caused mainly by the ball falling sound due to the bearing clearance and the sound of collision between the cage and the balls (the cage sound) as the cage vibrates to collide against the balls. The sound in (1)–(c) is caused mainly by scratches, impressions, rust or adhesion of foreign substances, such as dust on the surfaces of the rolling elements or the raceway surfaces of the inner and outer ring.

The type of sound (2) is found in the case where when the rolling contact bearing, which has nonlinear spring characteristics, is attached to a machine part, such as a shaft, housing or the like, it is combined with the mass of such machine part to form a vibration system, wherein the resonance between the self-excited vibration of the bearing and the natural vibration of the machine part forms the main cause of said sound.

As described above, the sound producing mechanism in rolling contact bearings is very complicated and various causes intricately combine with each other, thus producing sounds. This applies directly to a tension pulley, a fact which accounts for the fact that "the cause of cold-time sounds in a tension pulley has not yet been proved precisely". In this connection, it may be said that of the aforesaid conventional countermeasures, improvement in and selection of grease and increases in the radius of curvature of bearing rings and in the bearing clearance are oriented to the (1)–(a), intended to prevent self-excited vibration of the rolling elements to thereby suppress cold-time sounds. That is, according to the former countermeasure, the improvement in and selection of grease brings about uniformity in oil film, uniformity in friction coefficient, in the areas of contact between the rolling elements and the raceway surfaces, while according to the latter countermeasure the increases in the radius of curvature and bearing clearance weaken the elastic property of the bearing, whereby the self-excited vibration of the bearing is prevented. In addition, in the latter, an increase in the radius of curvature contributes to prevention of axial self-excited vibration and an increase in bearing clearance contributes to prevention of radial self-excited vibration. Of the aforesaid conventional countermeasures, the arrangement in which the cage is contacted with the inner or outer ring with a negative clearance belongs to the means in (1)–(b).

From the viewpoints of said (1)–(a) and (2), the present invention is intended to suppress sounds in a bearing, particularly cold-time sounds in a tension pulley. This is because it is believed that since cold-time sounds literally are sounds occurring at a cold time, the unevenness or nonconformity in oil film due to increased grease viscosity (at a cold time) is the main cause and that since the tension pulley is of integral construction comprising the pulley body and the rolling contact bearing, the sound is amplified by the resonance in vibration of the two machine parts. That is, the presence of unevenness or nonuniformity in oil film causes microscopic periodic changes in friction coefficient between the rolling elements and the raceway surfaces of the inner and outer rings, whereby the self-excited vibration is produced in the rolling elements. Particularly when regions of broken oil films are present, the rolling elements produce stick slip in such regions, periodically repeating switching between their rolling and slipping states, thereby increasing the amplitude and frequency of the self-excited vibration of the rolling elements. And such self-excited vibration of the rolling elements is transmitted to the pulley body through the outer ring and are amplified as they resonate with the natural vibration of the pulley body. Therefore, in order to suppress cold-time sounds, it is believed to be particularly effective to suppress the self-excited vibration of the rolling elements. In addition, in said (1)–(a), the elastic property of bearings and the causes in (1)–(b) and (c) are matters corresponding to bearings in general and can hardly be thought to be factors which are to be considered particularly important in preparing countermeasures against cold-time sounds in tension pulleys. These are matters to be separately considered in the bearing designing and manufacturing steps.

The present invention provides an arrangement for preventing self-excited vibration of rolling elements and preventing cold-time sounds, wherein a slight clearance is formed between the inner surface of the outer ring and the outer surface of the cage or between the outer surface of the inner ring and the inner surface of the cage.

For example, in an arrangement wherein a slight clearance is formed between the inner surface of the outer ring and the outer surface of the cage, when the outer ring rotates (in the case of outer ring rotation), the cage is rotated concomitantly with the rotation of the outer ring under the influence of the viscosity of an oil film or the like present in the slight clearance and contacts the rolling elements with a suitable degree of contact force. Through the contact force from the cage, the rolling elements housed in the cage receive a force acting in the direction of planetary rotation from the wall surfaces of pockets of the cage, and the behavior of the rolling elements in other directions than the direction of planetary rotation, particularly the behavior in the axial direction is restrained. Thereby, the occurrence of self-excited vibration due to the stick slip and the like of the rolling elements is prevented and cold-time sounds are suppressed. Further, since an oil film is formed in the slight clearance, the wear due to concomitant rotation of the cage is small in amount and the durability of the rolling contact bearing is secured at the same time.

For example, in an arrangement wherein a slight clearance is formed between the outer surface of the inner ring and the inner surface of the cage, when the outer ring rotates (in the case of outer ring rotation), the cage is rotated concomitantly with the stoppage of the inner ring under the influence of the viscosity of an oil film or the like present in the slight clearance and contacts the rolling elements with a suitable degree of contact force. Through the contact force (brake force) from the cage, the rolling elements housed in the cage receive a force acting in the opposite direction to that of planetary rotation from the wall surfaces of the pockets, and the behavior of the rolling elements in other directions than the direction of planetary rotation, particularly the behavior in the axial direction is restrained.

As is clear from above, the contact force from the cage, i.e., the force produced by the cage to act on the rolling elements in the direction of planetary rotation or in the opposite direction to that of planetary rotation has only to be of such a degree as to suppress the self-excited vibration of the rolling elements; if the degree is too high, it would interfere with normal rotation of the rolling elements and undesirably enhance the stick slip of the rolling elements, leading to self-excited vibration. In the present invention, the purpose of making said arrangement in which a slight clearance is formed between the cage and the outer or inner ring is to impart to the cage a suitable degree of contact force effective to suppress the behavior of the rolling elements in the directions other than the direction of planetary rotation, thereby restraining the rolling elements within a range in which the normal rotation of the rolling elements is not impeded. In addition, the same functions as described above will be developed also in the case of inner ring rotation.

As has been described so far, in the present invention, since a slight clearance is formed between the inner surface of the outer ring and the outer surface of the cage or between the outer surface of the inner ring and the inner surface of the cage, the concomitant rotation of the cage associated with the rotation (or stoppage) of the outer (or inner) ring causes the rolling elements received in the cage to receive a contact force acting in the direction of planetary rotation (or in the opposite direction to that of planetary rotation) from the cage; thus, the behavior thereof in the other directions than the direction of planetary rotation, particularly the behavior in the axial direction, is restrained, thereby preventing the occurrence of self-excited vibration due to stick slip or the like of the rolling elements and effectively suppressing cold-time sounds. Further, the presence of the slight clearance results in an oil film being formed between the inner surface of the outer ring and the outer surface of the cage, so that there is no wear due to rotation-concomitant (or stoppage-concomitant) rotation of the cage and the durability of the cage is secured at the same time.

Therefore, according to the invention, it is possible to provide a rolling contact bearing which is superior in durability and acoustic properties. And such effects are remarkably developed particularly when the invention is applied to a rolling contact bearing for pulleys.

BRIEF DESCRIPTION OF THE DRAWINGS

FIG. 1 is a sectional view showing an embodiment of the present invention (FIG. 1a), and a fragmentary enlarged sectional view of the ball bearing in FIG. 1a (FIG. 1b).

FIG. 3 is a sectional view showing another embodiment of the invention (FIG. 3a), and a fragmentary enlarged sectional view of the ball bearing in FIG. 3a (FIG. 3b).

DESCRIPTION OF THE PREFERRED EMBODIMENTS

Figure 2A:
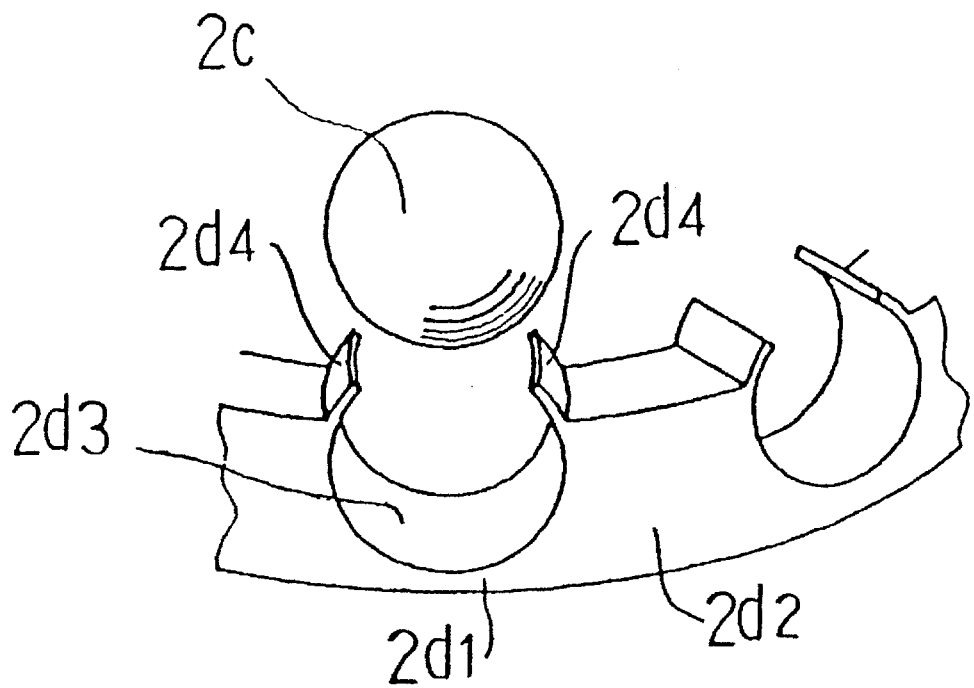
FIG. 2 is a perspective view of a cage according to an embodiment of the invention (FIG. 2a), and a developed plan view as seen in the direction of the outer diameter (FIG. 2b).

An embodiment in which the present invention is applied to a tension pulley will now be described.

A tension pulley shown in FIG. 1 is used in a belt transmission mechanism for automobiles and the like. This tension pulley comprises a pulley body 1 of press-molded steel plate and a ball bearing 2 integrally fitted in the inner surface of the pulley body 1.

The pulley body 1 is an annular body of substantially U-shaped cross section, comprising an outer cylindrical portion 1a for having a belt entrained therearound, an inner cylindrical portion 1b disposed inwardly of the outer cylindrical portion 1a, and a continuous portion 1c for interconnecting the outer and inner cylindrical portions 1a and 1b on one end side. It serves as an idler or tensioner in that a belt (not shown) contacts the outer cylindrical portion 1a.

The ball bearing 2 comprises an inner ring 2a fitted on a shaft (not shown), an outer ring 2b fitted in the inner cylindrical portion 1b of the pulley body 1, a plurality of balls 2c held between the raceway surfaces of the inner and outer rings 2a and 2b, a cage 2d for retaining the balls at circumferential equispaced intervals, and a pair of seals 2e for sealing a lubricant, e.g., grease, in the bearing. The cage 2d is made of synthetic resin, such as polylmide, PPS (polyphenylene sulfide), nylon 66, or (PA66+GF25%).

Figure 2B:
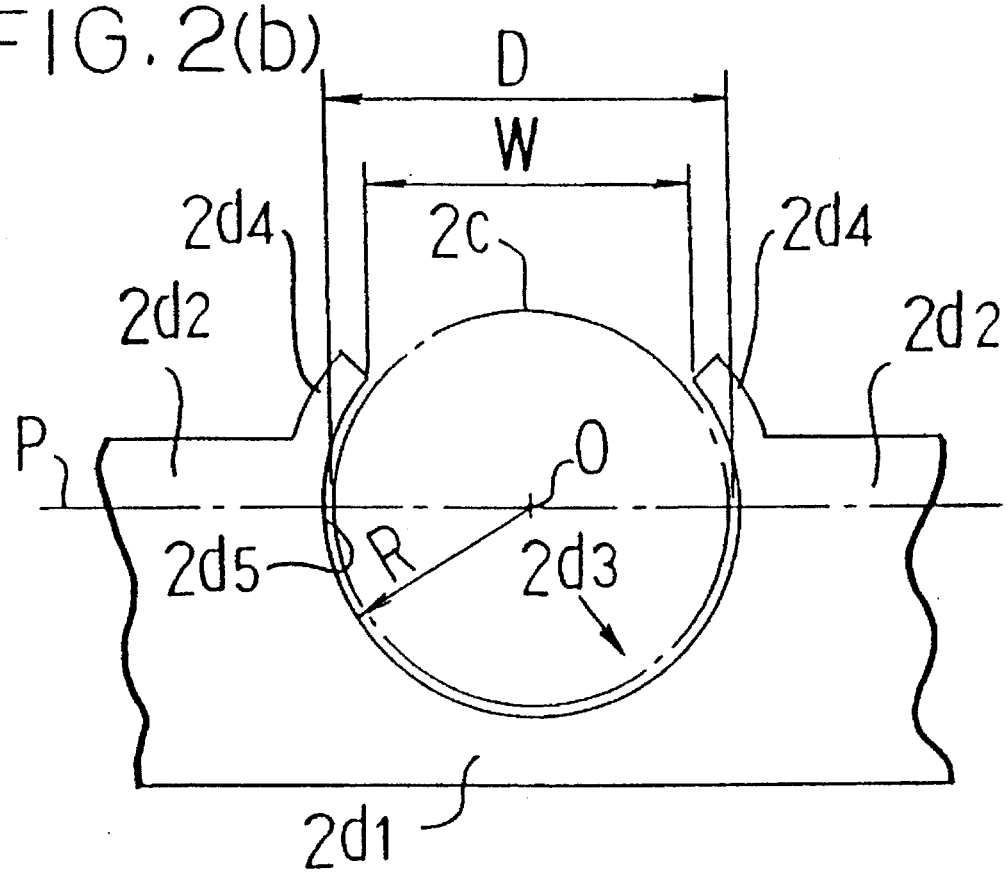

As shown in FIG. 2, the cage 2d is of the so-called crown type, having a plurality of column portions 2d2 axially extending from circumferentially equispaced positions, with a pocket 2d3 defined between circumferentially adjacent column portions 2d2 for rollably receiving a ball 2c. Each column portion 2d2 has pawl portions 2d4 on its front end, and the distance W between circumferentially opposed pawl portions 2d4 with the pocket 2d3 disposed therebetween is smaller than the diameter D of the ball 2c to be received. Further, the wall surface 2d5 of the pocket 2is depicted with a spherical surface having a radius R at a center 0 on the pitch circle P of the balls 2c. The radius R is greater than half the diameter D of the ball 2c by an amount corresponding to the pocket clearance (one side).

Figure 4A:
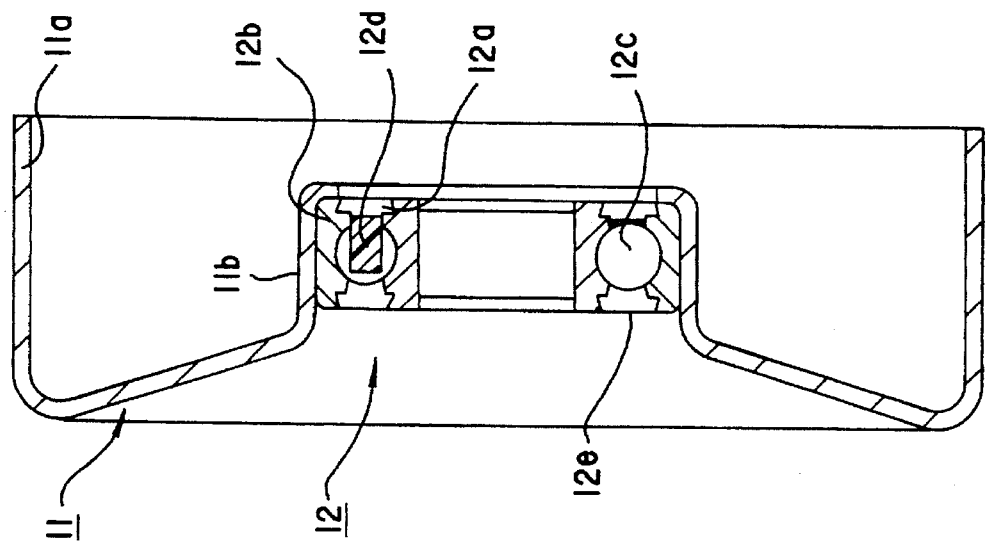
FIG. 4 is a sectional view showing a conventional arrangement (FIG. 4a), and a fragmentary enlarged sectional view of the ball bearing in FIG. 4a (FIG. 4b).
Figure 4B:
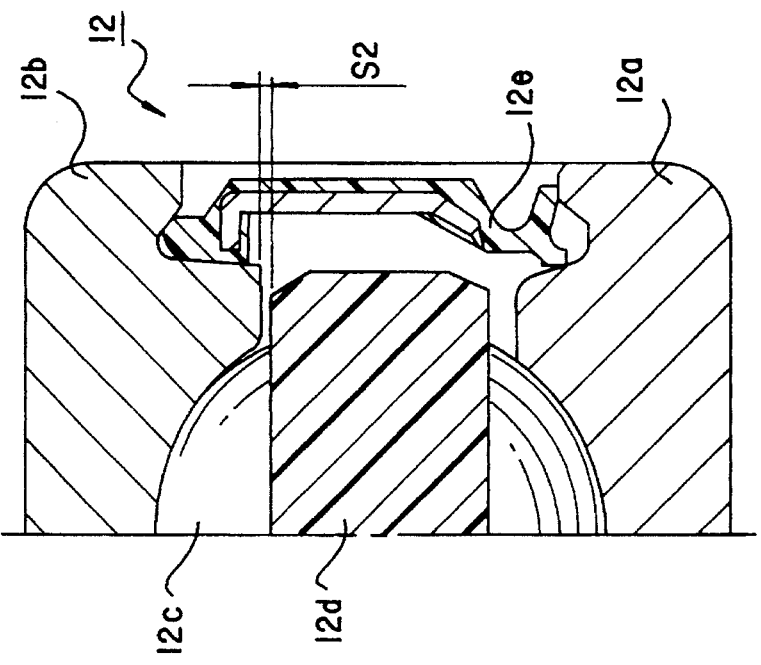

As shown enlarged in FIG. 1b, the point in which the tension pulley of this embodiment differs from a conventional article shown in FIG. 4 is that the clearance between the inner surface of the outer ring 2b and the outer surface of the cage 2d is a slight clearance S1 which is smaller than the clearance S2 between the inner surface of the outer ring 12b and the outer surface of the cage 12d in the conventional arrangement (ball guide type). The size of this slight clearance S1 is smaller than the pocket clearance (one side) and is such that it causes concomitant rotation of the cage 2d associated with the rotation of the outer ring 2b.

When the pulley 1 is rotated under torque from the belt, the outer ring 2b of the ball bearing 2 fitted therein is rotated together with the pulley body 1. And the cage 2d opposed to the inner surface of the outer ring 2b with the slight clearance S1 defined therebetween is rotated concomitantly with the rotation of the outer ring 2b and contacts the balls 2c with a suitable degree of force. Under the contact force from the cage 2d, the balls 2c held in the cage 2d receive a force acting in the direction of planetary rotation from the wall surfaces 2d5 of the pockets 2d3; thus, the behavior thereof in the other directions than the direction of planetary rotation, particularly the behavior in the axial direction, is restrained, thereby preventing the occurrence of self-excited vibration due to stick slip or the like of the balls 2c and suppressing cold-time sounds. Further, the presence of the slight clearance S1 results in the formation of an oil film between the inner surface of the outer ring 2b and the outer surface of the cage 2d, so that there is no wear due to the concomitant rotation of the cage 2d and the durability of the ball bearing 2 is secured at the same time. In addition, since the contact between the outer ring 2b and the cage 2d is a metal-to-synthetic resin contact and hence there is no phenomenon of seizure unlike the case of a metal-to-metal contact; thus, it is much harder for wear in the cage 2d to take place.

The size of the slight clearance S1 is such that the interposition of an oil film can be expected and such that concomitant rotation of the cage 2d associated with the rotation of the outer ring 2b takes place, and it may be selected at an optimum value within a range in which such function can be developed. According to experiments, it has been found that optimum results can be obtained in the case where the target value of the dimension of the slight clearance S1 is 0.05 mm (0.1 mm, expressed in diameter).

Under the presence of such slight clearance S1 as mentioned above, there may be conceived various causes of an advancing force being applied to the cage 2d, including the viscosity of the oil film present in the slight clearance S1, partial contact with the inner surface of the outer ring 2b due to the behavior of the cage 2d during rotation, the difference in linear expansion coefficient between the outer ring 2b and the cage 2d, and partial contact (contact between the inner surface of the outer ring 2b and the outer surface of the cage 2d) due to deviation of the outer ring 2b and cage 2d from true circle. Partial contact due to deviation from true circle means that since, microscopically, the outer ring 2b and cage 2d are not of perfect circle and rather they are somewhat distorted, in the sense that such distortion is within the range of necessarily occurring deformation in terms of manufacture, they partially contact at a plurality of circumferential locations. Therefore, depending upon the size of the slight clearance S1, the degree by which the outer ring 2b and cage 2d are deviated from true circle, thermal expansion and the like, there may be cases where the outer ring 2b and the cage 2d partially contact each other with some negative clearance. In this sense, the slight clearance S1 means a clearance which is slight in the average, including a state in which some partial negative clearance is produced.

In an embodiment shown in FIG. 3, a slight clearance S'1 is formed between the outer surface of the inner ring 2a and the inner surface of the cage 2d. The slight clearance S1 is of the same size as that of the slight clearance S1 in the embodiment described above.

When the pulley body 1 is rotated as it receives torque from the belt, the outer ring 2b of the ball bearing 2 fitted therein is rotated in a unit with the pulley body 1. And the cage 2d opposed to the outer surface of the inner ring 2a with the slight clearance S'1 defined therebetween is rotated concomitantly with the stoppage of the inner ring 2a and contacts the bails 2c with a suitable degree of contact force. Under the contact force (braking force) from the cage 2d, the balls 2c received in the cage 2d receive a force acting in the opposite direction to that of planetary rotation from the wall surfaces 2d5 of the pockets 2d3; thus, the behavior thereof in the other directions than the opposite direction to that of planetary rotation, particularly the behavior in the axial direction, is restrained, thereby preventing the occurrence of self-excited vibration due to stick slip or the like of the balls 2c and suppressing cold-time sounds.

In the above embodiments, the present invention is applied to a tension pulley; however, the invention is not limited thereto and is applicable to bearings, particularly ball bearings, in general, in which case the same functions and effects as above can be attained. While the embodiments in which the outer ring rotates have been described, the same functions and effects can be attained also in the case where the inner ring rotates.

What is claimed is:

1. A rolling contact bearing comprising an outer ring, an inner ring, a plurality of rolling elements held between said outer ring and said inner ring, and a cage for retaining said rolling elements, wherein a slight clearance is formed between an inner surface of said outer ring and an outer surface of said cage or between an outer surface of said inner ring and an inner surface of said cage, wherein a size of said slight clearance is such that a film of lubricant is formed therein and such that the cage receives an advancing force or a braking force from one of said outer ring and said inner ring opposed to said cage with said slight clearance when the rolling contact bearing is rotated, thereby said cage contacts said rolling elements.

2. A rolling contact bearing as set forth in claim 1 wherin; the rolling elements are balls.

3. A rolling contact bearing for pulleys comprising an outer ring, an inner ring, a plurality of rolling elements held between said outer ring and said inner ring, and a cage for retaining said rolling elements, wherein a slight clearance is formed between an inner surface of said outer ring fitted in an inner surface of a pulley body and an outer surface of said cage or between an outer surface of said inner ring and an inner surface of said cage, wherein a size of said slight clearance is such that a film of lubricant is formed therein and such that the cage receives an advancing force or a braking force from one of said outer ring and said inner ring opposed to said cage with said slight clearance when the rolling contact bearing is rotated, thereby said cage contacts said rolling elements.

4. A rolling contact bearing for pulley comprising an outer ring, an inner ring, a plurality of rolling elements held between said outer ring and said inner ring, and a cage for retaining said rolling elements, wherein a slight clearance is formed between the inner surface of the outer ring fitted in the inner surface of the pulley body and the outer surface of the cage, wherein a size of said slight clearance is such that a film of lubricant is formed therein and such that the cage receives an advancing force or a braking force from said outer ring opposed to said cage with said slight clearance when the rolling contact bearing is rotated, thereby said cage contacts said rolling elements.

5. A rolling contact bearing for pulleys as set forth in claim 3 or 4 wherein;

the rolling elements are balls.

6. A pulley comprising a pulley body, an outer ring, an inner ring, a plurality of rolling elements held between said outer ring and said inner ring, and a cage for retaining said rolling elements, wherein said rolling elements are fitted in an inner surface of the pulley body, wherein a slight clearance is formed between an inner surface of said outer ring and an outer surface of said cage or between an outer surface of said inner ring and an inner surface of said cage of said rolling contact bearing, wherein a size of said slight clearance is such that a film of lubricant is formed therein and such that the cage receives an advancing force or a braking force from one of said outer ring and said inner ring opposed to said cage with said slight clearance when the rolling contact bearing is rotated, thereby said cage contacts said rolling elements.

7. A pulley as set forth in claim 6 wherein;

the rolling contact bearing is a ball bearing.

8. A tension pulley comprising a pulley body and a rolling contact bearing fitted in an inner surface of the pulley body, an outer ring, an inner ring, a plurality of rolling elements held between said outer ring and said inner ring, and a cage for retaining said rolling elements, wherein a slight clearance is formed between an inner surface of said outer ring and an outer surface of said cage or between an outer surface of said inner ring and an inner surface of said cage of said rolling contact bearing, wherein a size of said slight clearance is such that a film of lubricant is formed therein and such that the cage receives an advancing force or a braking force from one of said outer ring and said inner ring opposed to said cage with said slight clearance when the rolling contact bearing is rotated, thereby said cage contacts said rolling elements.

9. A tension pulley as set forth in claim 8 wherein;

the rolling contact bearing is a ball bearing.

* * * * *